(12) United States Patent
Salter et al.

(10) Patent No.: US 9,738,219 B1
(45) Date of Patent: Aug. 22, 2017

(54) ILLUMINATED VEHICLE TRIM

(71) Applicant: Ford Global Technologies, LLC, Dearborn, MI (US)

(72) Inventors: Stuart C. Salter, White Lake, MI (US); Alex Lince, St. Clair Shores, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/151,530

(22) Filed: May 11, 2016

(51) Int. Cl.
*B60Q 1/00* (2006.01)
*B60Q 1/26* (2006.01)
*B60Q 3/02* (2006.01)
*F21V 23/04* (2006.01)
*F21V 9/16* (2006.01)
*F21V 3/00* (2015.01)

(52) U.S. Cl.
CPC ............. *B60Q 3/0203* (2013.01); *B60Q 1/26* (2013.01); *B60Q 3/0296* (2013.01); *F21V 3/00* (2013.01); *F21V 9/16* (2013.01); *F21V 23/0471* (2013.01)

(58) Field of Classification Search
CPC ... B60Q 1/26; B60Q 3/00; B60Q 3/20; B60Q 3/208; B60Q 3/50; B60Q 3/51; B60Q 3/54; B60Q 3/68; F21V 3/00; F21V 9/16; F21V 23/0471
USPC ................................. 362/488, 490, 509–510
See application file for complete search history.

(56) References Cited

U.S. PATENT DOCUMENTS

| | | | |
|---|---|---|---|
| 2,486,859 A | 11/1949 | Meijer et al. |
| 5,053,930 A | 10/1991 | Benavides |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |

(Continued)

FOREIGN PATENT DOCUMENTS

CN 101337492 A 1/2009
CN 201169230 Y 2/2009
(Continued)

*Primary Examiner* — Jason Moon Han
(74) *Attorney, Agent, or Firm* — Vichit Chea; Price Heneveld LLP (57) ABSTRACT

A trim assembly for a vehicle is provided herein. The trim assembly includes a backing panel defining a void therethrough. A foam panel is attached to the backing panel on a first side and is attached to a cover on a second opposing side. The foam panel and the cover are light transmissive. A light source is disposed within the void and is configured to emit excitation light. A photoluminescent structure is disposed on an inner periphery of the void and the first side of the foam panel and is configured to luminesce in response to excitation by the light source. A bumper extends into the void to a position past a bottom surface of the light source.

20 Claims, 9 Drawing Sheets

(56) References Cited

U.S. PATENT DOCUMENTS

| | | |
|---|---|---|
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| RE42,340 E | 5/2011 | Anderson et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,162,519 B2 | 4/2012 | Salter et al. |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,387,257 B2 | 3/2013 | Salter et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,449,156 B2 | 5/2013 | Salter et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0043888 A1 | 2/2012 | Salter et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0301286 A1 | 11/2013 | Moussa |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

ILLUMINATED VEHICLE TRIM

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a trim assembly for a vehicle is disclosed. The trim assembly includes a backing panel defining a void therethrough. A foam panel is attached to the backing panel on a first side and is attached to a cover on a second opposing side The foam panel and the cover are light transmissive. A light source is disposed within the void and configured to emit excitation light. A photoluminescent structure is disposed on an inner periphery of the void and the first side of the foam panel and configured to luminesce in response to excitation by the light source. A bumper extends into the void to a position past a bottom surface of the light source.

According to another aspect of the present invention, a vehicle is disclosed. The vehicle includes a headliner including a backing panel, a foam panel, and a cover. A light source is disposed within a void defined by the backing panel. A photoluminescent structure is disposed on the foam panel and is configured to luminesce in response to excitation by a light source.

According to another aspect of the present invention, a headliner for a vehicle is disclosed. The headliner includes a backing panel defining a void. A light source is disposed within the void. A bumper is also disposed within the void. The bumper extends a first distance past the light source in a neutral state and a second, shorter distance past the light source when the bumper is compressed. A retainer is coupled to the bumper and extends above the backing panel.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated trim assembly that may be formed within a vehicle headliner. The trim assembly may include one or more photoluminescent structures configured to convert an excitation light received from an associated light source to a converted light at a different wavelength typically found in the visible spectrum.

Figure 1A:
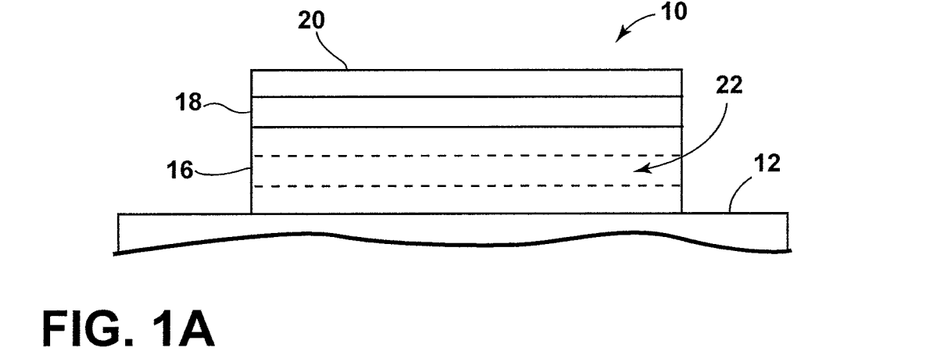
FIG. 1A is a side view of a photoluminescent structure rendered as a coating for use in a vehicle illuminated trim assembly according to one embodiment.
Figure 1B:
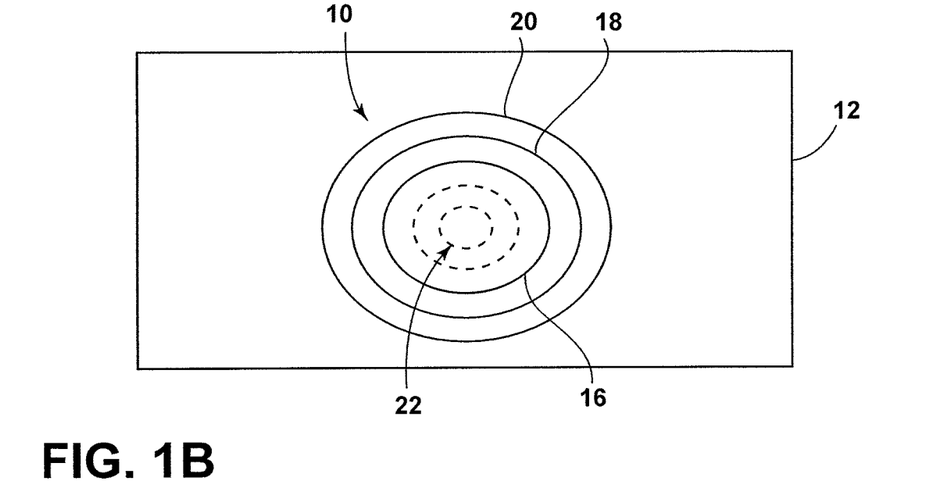
FIG. 1B is a top view of a photoluminescent structure rendered as a discrete particle according to one embodiment.
Figure 1C:
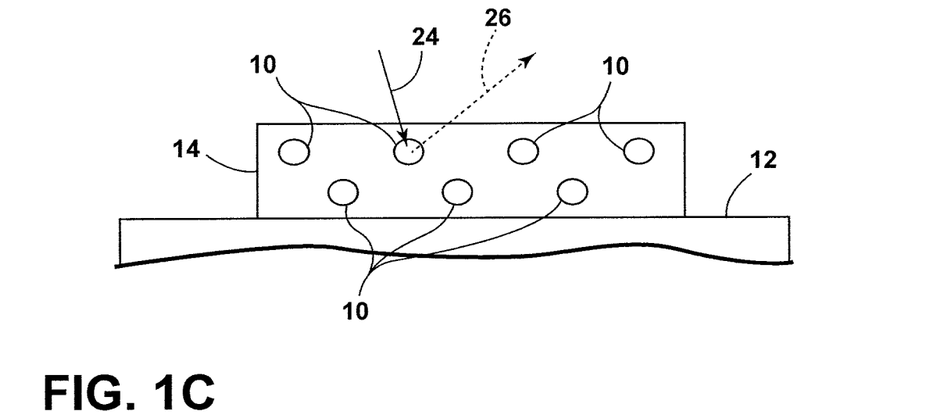
FIG. 1C is a side view of a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 22 having energy converting elements with phosphorescent or fluorescent properties. Each photoluminescent material 22 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 58 (FIG. 4) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 22 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 22 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 22 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 18 to protect the photoluminescent material 22 contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protective layer 20 optically coupled and adhered to the stability layer 18 or other layer (e.g., the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Patent Publication No. 2014/0103258 A1 to Agrawal et al., entitled "CHROMIC LUMINESCENT COMPOSITIONS AND TEXTILES," all of which are incorporated herein by reference in their entirety.

According to one embodiment, the photoluminescent material 22 may include organic or inorganic fluorescent dyes including rylenes, xanthenes, porphyrins, phthalocyanines. Additionally, or alternatively, the photoluminescent material 22 may include phosphors from the group of Ce-doped garnets such as YAG:Ce and may be a short persistence photoluminescent material 22. For example, an emission by $Ce^{3+}$ is based on an electronic energy transition from 5 $d^1$ to 4 $f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 22 with ultra-short persistence characteristics, which can emit the converted light 26 by absorbing purple to blue excitation light 24 emitted from a light source 58. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 22, according to one embodiment, disposed within the photoluminescent structure 10 may include a long persistence photoluminescent material 22 that emits the converted light 26, once charged by the excitation light 24. The excitation light 24 may be emitted from any excitation source (e.g., any natural light source, such as the sun, and/or any artificial light source 58). The long persistence photoluminescent material 22 may be defined as having a long decay time due to its ability to store the excitation light 24 and release the converted light 26 gradually, for a period of several minutes or hours, once the excitation light 24 is no longer present.

The long persistence photoluminescent material 22, according to one embodiment, may be operable to emit light at or above an intensity of 0.32 mcd/m$^2$ after a period of 10 minutes. Additionally, the long persistence photoluminescent material 22 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 22 may continually illuminate in response to excitation from any light source 58 that emits the excitation light 24, including, but not limited to, natural light sources (e.g., the sun) and/or any artificial light source 58. The periodic absorption of the excitation light 24 from any excitation source may provide for a substantially sustained charge of the long persistence photoluminescent material 22 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 22 may correspond to alkaline earth aluminates and silicates, for example doped di-silicates, or any other compound that is capable of emitting light for a period of time once the excitation light 24 is no longer present. The long persistence photoluminescent material 22 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2:
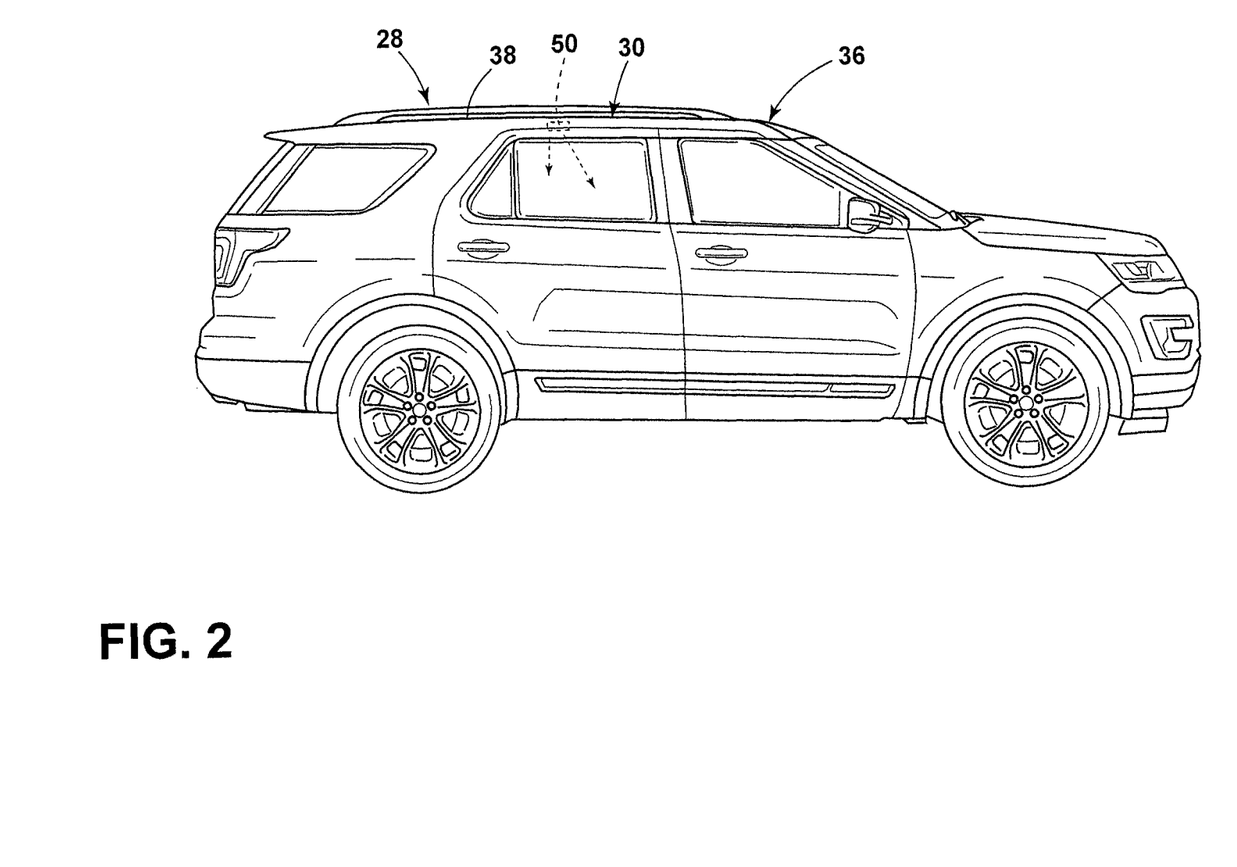
FIG. 2 is a side perspective view of a vehicle employing an illuminated trim assembly within a cabin of the vehicle, according to one embodiment.
Figure 3:
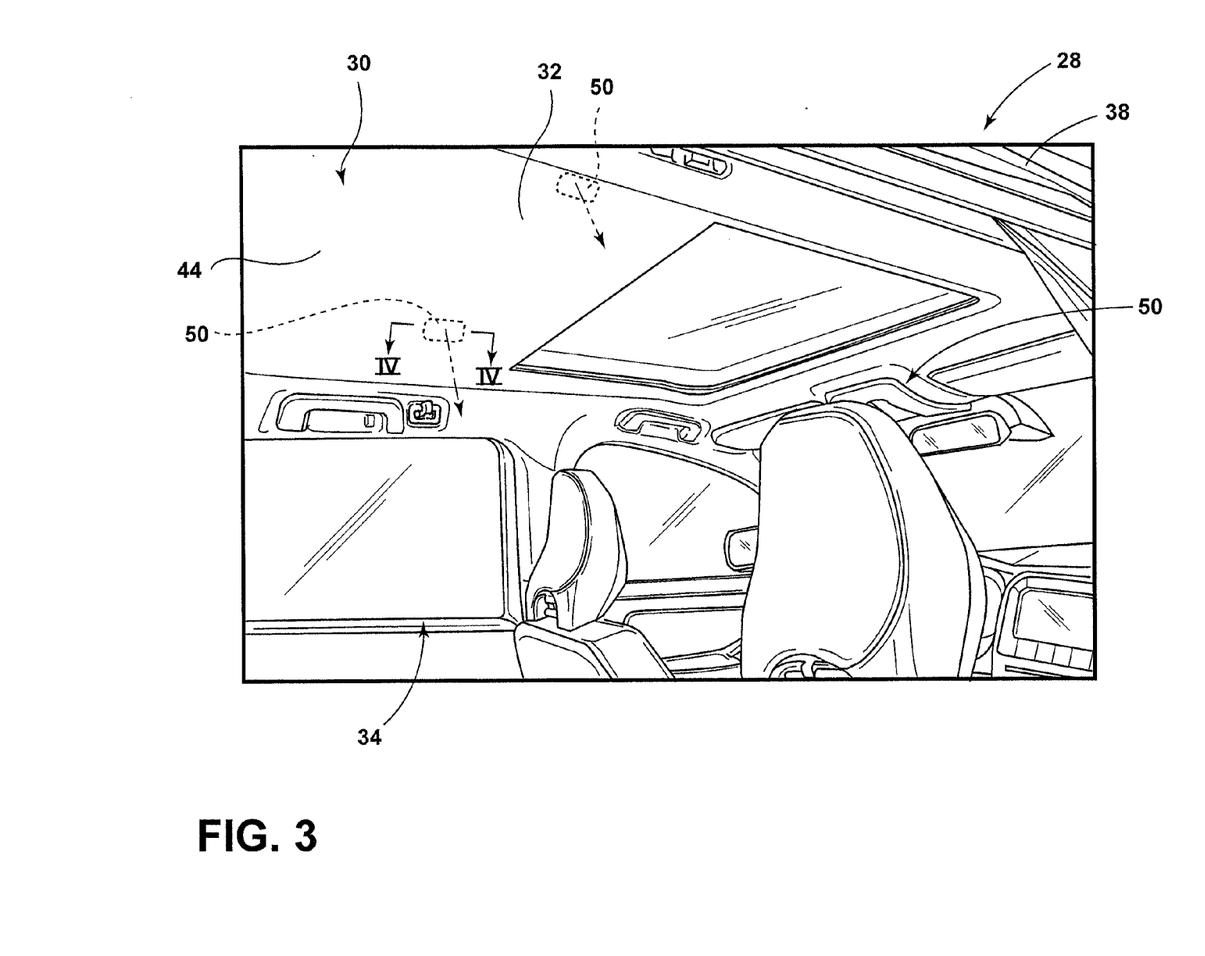
FIG. 3 is a partial perspective view of the interior of the vehicle employing the illuminated trim assembly, according to one embodiment.

Referring to FIGS. 2 and 3, a vehicle 28 includes an illuminated trim assembly 30, such as a headliner 32, disposed within a vehicle cabin 34. The headliner 32 may be disposed proximate a body structure 36 of the vehicle 28 that forms an exterior surface of the vehicle 28. In the illustrated embodiment, the trim assembly 30 is shown in the form of a headliner 32; however, other trim assemblies, including pillar trim, interior panels, and the like are contemplated according to other embodiments. Further, the body structure 36 is shown in the form of a roof structure 38; however, other body structures, including pillars, body panels, and the like are contemplated. It will be appreciated that the illuminated trim assembly 30 described herein may also be utilized on any exterior portion of the vehicle 28. For example, the trim assembly 30 provided herein may be used in conjunction with a door lock feature on the vehicle 28, on an exterior trim component of the vehicle 28, or on any other interior and/or exterior location of the vehicle 28.

The headliner 32 may be a formed and/or molded to be mounted to an interior surface 40 (FIG. 4) of the roof structure 38 of the vehicle 28. The headliner 32 has a top surface 42 (FIG. 4), which faces the supporting roof structure 38 when installed in the vehicle 28, and an opposite, interior surface 44 that may be upholstered to provide a decorative surface visible from the interior of the vehicle 28. The headliner 32 may be shaped to conform to portions of the corresponding roof structure 38 and may include a plurality of contours and apertures for mounting various overhead components 50, such as sun visors, overhead consoles, grab handles, lights, and the like.

Figure 4:
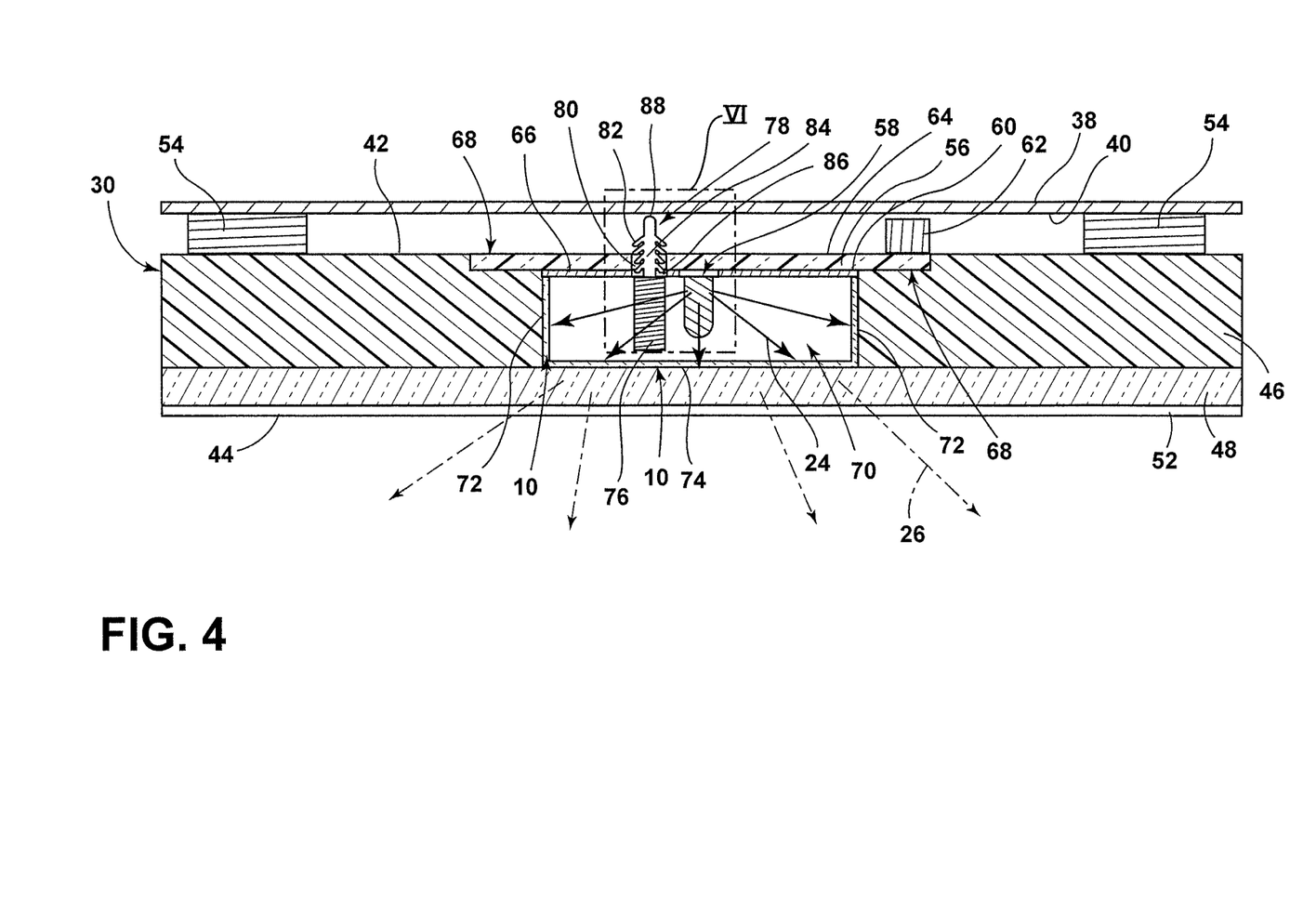
FIG. 4 is a cross-sectional view taken along line IV-IV of FIG. 3 illustrating a light source disposed within a headliner, according to one embodiment.
Figure 5:
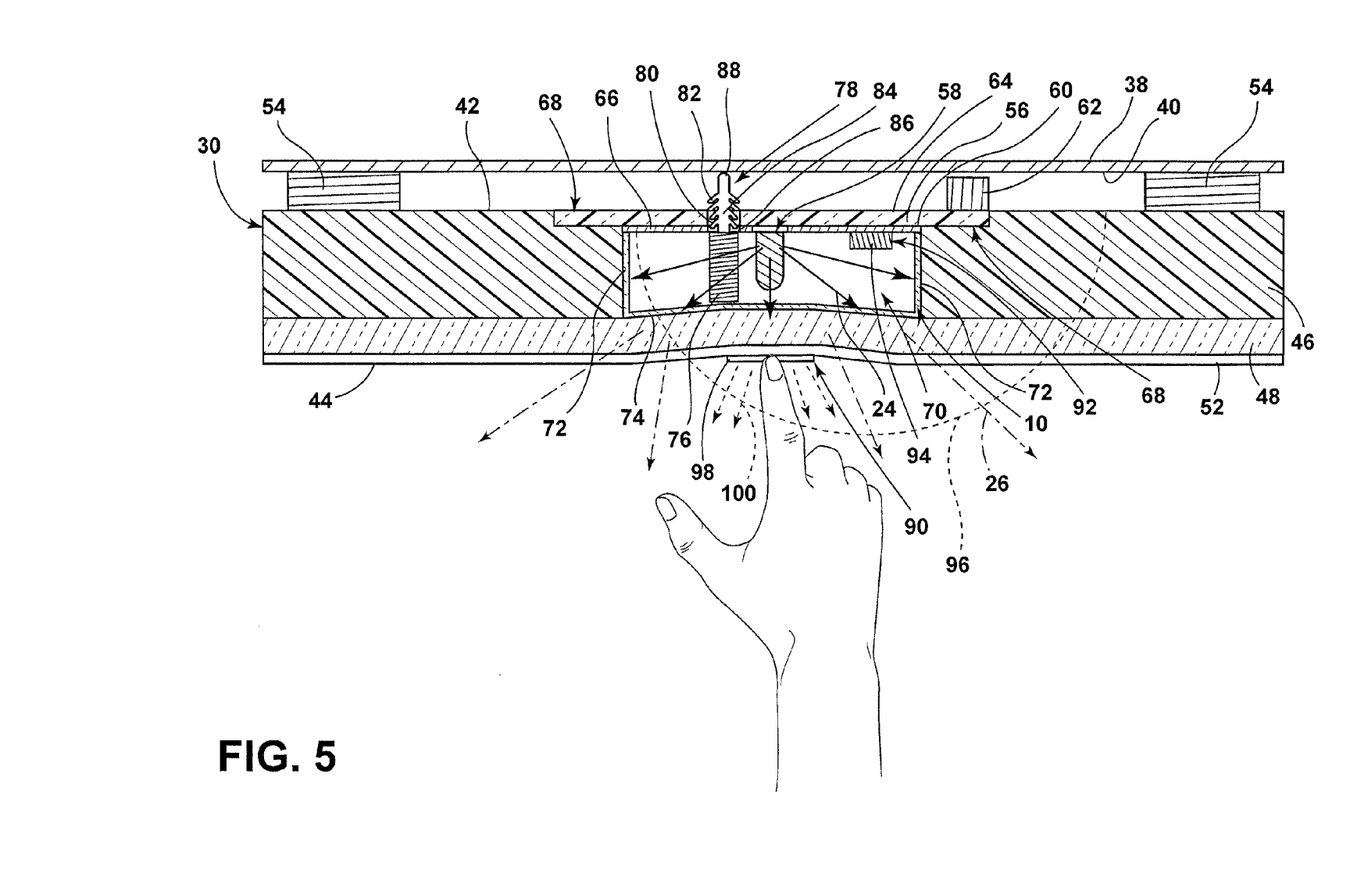
FIG. 5 is an alternative cross-sectional view taken along line IV-IV of FIG. 3 illustrating the light source and a switch within the headliner, according to one embodiment.

Referring to FIGS. 4 and 5, the headliner 32 includes a relatively stiff semi-flexible backing panel 46 proximate to the roof structure 38 and a foam panel 48 attached to the backing panel 46. The backing panel 46 may be a molded panel that is relatively stiff and rigid so as to act as a substantially stationary backstop for the foam panel 48 and to support the mounting of any desired overhead components 50. The backing panel 46 can be a polymeric panel, a fiberglass panel, or any other desired material that may be molded in a separate operation prior to assembling foam panel 48 onto the backing panel 46.

An attachment feature 54 is disposed between the backing panel 46 and the roof structure 38 to attach the two components to one another. It is contemplated that the backing panel 46 may be attached to the roof structure 38 through any means known in the art without departing from the teachings provided herein.

The foam panel 48 can be a relatively soft cellular foam material, such as a material containing urethane, and may have any desired thickness. As will be described in greater detail below, the foam panel 48 may be light transmissive. According to one embodiment, the foam panel 48 maintains a substantially uniform thickness along the backing panel 46. Alternatively, the foam panel 48 may have variable thickness based on the locations of the foam panel 48 in relation to other features of the vehicle cabin 34. For instance, the foam panel 48 may be thicker, or thinner, near overhead components 50, may have a variable thickness in locations disposed above seating assemblies disposed within the vehicle 28, or may vary in thickness for any other reason without departing from the teachings provided herein.

The bottom surface of foam panel 48 is covered with a decorative, flexible cover 52, which can be a woven cloth with or without a thin foam sheet faced with coating attached thereto. The cover 52 can have any desired thickness. For example, according to one embodiment, the thickness of the cover 52 is less than one quarter of an inch. To attach the cover 52 to the foam panel 48, the cover 52 may have an adhesive sprayed onto one surface of the cover 52.

With further reference to FIGS. 4 and 5, the illuminated trim assembly 30 may further include a printed circuit board (PCB) 56 that is attached to the backing panel 46. The PCB 56 may be secured to the backing panel 46 at any angle so a light source 58 disposed on a first side 60 of the PCB 56 and is positioned towards a desired target location. A rigid or flexible electrical connector 62 may be disposed on a second side 64 of the PCB 56. The electrical connector 62 may connect the PCB 56 to another electronic component using a zero insertion force (ZIF) integrated circuit (IC) socket or any type electrical mating assembly known in the art, which may include a generally flexible tail or ribbon portion having conductive elements disposed therein to electronically couple the PCB 56 with an electronic component within the vehicle 28. A white solder mask 66 may be applied to the PCB 56 to reflect light incident thereon.

According to one embodiment, a multi-step molding process is used to couple the PCB 56 to the backing panel 46. Initially, the backing panel 46 is formed through a first injection molding step. The PCB 56 is then molded and/or coupled to the backing panel 46 in a second injection molding step. In alternative embodiments, additional components may be added during one of the injection steps, or successively added in additional injections to adhere additional components to the trim assembly 30. A peripheral portion 68 of the PCB 56 may have a heat sensitive glue or hot melt adhesive on the first side 60 thereof that is activated during the molding of the components to couple the PCB 56 to the backing panel 46. Furthermore, a molding tool for the trim assembly 30 may include a void 70 therein that is configured to encompass the electrical connector 62 that may extend upwardly of the top surface 42 of the backing panel 46.

The backing panel 46 may define a void 70 proximately to a portion of the PCB 56. The electrical components disposed on the PCB 56, including the light source 58, may be disposed on the portion of the PCB 56 that is adjacent to the void 70 thereby encapsulating the components between the backing panel 46, the foam panel 48, and the PCB 56.

The light source 58 may be configured to emit non-focused excitation light 24 that excites the photoluminescent structure 10. The light source 58 may comprise any form of light source that may be disposed on the first side 60 of the PCB 56 and oriented to face towards the vehicle cabin 34. For example, fluorescent lighting, light emitting diodes (LEDs), organic LEDs (OLEDs), polymer LEDs (PLEDs), solid-state lighting, or any other form of lighting configured to emit light may be utilized. According to one embodiment, the light source 58 may be configured to emit a wavelength of excitation light 24 that is characterized as ultraviolet light (~10-400 nanometers in wavelength), violet light (~380-450 nanometers in wavelength), blue light (~450-495 nanometers in wavelength), and/or infrared light (IR) (~700 nm-1 mm in wavelength) to take advantage of the relative low cost attributable to those types of LEDs.

The photoluminescent structure 10 may be disposed on an inner periphery 72 of the void 70 and/or a top surface 74 of the foam panel 48. Additionally, or alternatively, the photoluminescent structure 10 may be disposed within the foam panel 48. According to one embodiment, the PCB 56 and the backing panel 46 are formed from an opaque material such that excitation light 24 and/or converted light 26 directed thereto becomes incident within the cavity. Contrarily, according to one embodiment, the foam panel 48 and the cover 52 may be light transmissive such that light may pass therethrough and into the vehicle cabin 34. Moreover, the translucent and/or transparent foam panel 48 and fabric cover 52 may substantially conceal the photoluminescent structure 10 such that the light source 58 and other components within the cavity may not be visible when the light source 58 is in an unilluminated state. It will be appreciated, however, that the photoluminescent structure 10 may be disposed within and/or on any other component described herein without departing from the teachings provided herein.

The photoluminescent material 22 disposed within the photoluminescent structure 10 is formulated to have an absorption spectrum that includes the emission wavelength of the excitation light 24 supplied from the light source 58. The photoluminescent material 22 is also formulated to have a Stokes shift resulting in the visible converted light 26 having an emission spectrum expressed in a desired color, which may vary per lighting application. The visible converted light 26 is outputted through the foam panel 48 and subsequently through the cover 52.

The photoluminescent structure 10 may diffuse the excitation light 24 emitted from the light source 58. The foam panel 48 may further diffuse the excitation light 24 and/or converted light 26 that passes through the photoluminescent structure 10 thereby acting as a second diffuser. The illumination provided by the photoluminescent structure 10 may offer a unique, substantially uniform, and/or attractive viewing experience that may be difficult to duplicate through non-photoluminescent and/or non-diffused means.

According to one embodiment, light emitted from light source 58 is converted by the photoluminescent structure 10 into light of a longer wavelength and outputted therefrom. The converted light 26 corresponds to a visible light, which includes the portion of the electromagnetic spectrum that can be detected by the human eye (~390-700 nanometers in wavelength) and may be expressed in a variety of colors defined by a single wavelength (e.g., red, green, blue) or a mixture of multiple wavelengths (e.g., white). Thus, it should be understood that the photoluminescent structure 10 may be configured such that converted light 26 outputted therefrom is capable of being expressed as unicolored or multicolored light.

According to one embodiment, the light source 58 is configured to emit blue light and the photoluminescent structure 10 is configured to convert the blue light into a neutral white light having a color temperature of approximately 4000K to 5000K. The converted light 26 escapes from the headliner 32 via the cover 52, thereby causing the headliner 32 to glow.

According to one embodiment, the photoluminescent structure 10 is substantially Lambertian, that is, the apparent brightness of the photoluminescent structure 10 is substantially constant regardless of an observer's angle of view. As a consequence, the converted light 26 may be emitted outwardly from the photoluminescent structure 10 in numerous directions. With respect to the embodiment shown in FIGS. 4 and 5, a portion of the converted light 26 may be transmitted through the foam panel 48 and the cover 52 thereby causing those portions to exhibit luminescence.

With further reference to FIGS. 4 and 5, a bumper 76 having a retainer 78 attached thereto may also extend downwardly into the void 70. The bumper 76 may be formed from a resilient material, such as, but not limited to, a polymeric material, an elastomeric material, or a combination thereof. The bumper 76 may be fully or partially transparent so as to prevent the bumper 76 from inhibiting the transmission of emitted excitation light 24 and/or converted light 26 within the void 70.

The retainer 78 may be attached to, or integrally formed with, the bumper 76. The retainer 78 may be configured to pass through a channel 80 defined by the PCB 56 to maintain the position of the bumper 76. According to one embodiment, the retainer 78 may include a barbed or "Christmas tree" configuration. In barbed embodiments, the retainer 78 may have a plurality of barbs 82 extending outward from an axis of a stem 84. The stem may have a proximal portion 86 that couples with the bumper 76 and a distal portion 88 that extends away from the bumper 76. The barbs 82 extend away from the stem 84 at an angle configured to allow easy insertion of the retainer 78 into the channel 80, but resist the removal of the retainer 78 from the channel 80. The angle and size of the barbs 82 may be altered to adjust the force required to separate the bumper 76 from the PCB 56. In the depicted embodiment, the barbs 82 are continuous and swept around the stem 84 of the retainer 78. In other embodiments, the barbs 82 are thin projections extending away from the stem 84.

Referring to FIG. 5, the trim light assembly 30 may further include a user interface 90 that includes a switch 92. According to one embodiment, the switch 92 may be configured as a proximity sensor 94 that may be operable to actuate a control output. In some embodiments, the proximity sensor 94 is a single or a plurality of proximity sensor(s) 94. Each of the proximity sensor(s) 94 may be configured to control at least one control output of the illuminated trim assembly 30. In some embodiments, the proximity sensors 94 may be implemented as capacitive sensors. However, it should be appreciated by those skilled in the art that other types of proximity sensors 94 may be used in addition to and/or alternatively to any other practicable sensor. Other embodiments of the proximity sensors 94 may include, but are not limited to, magnetic sensors, inductive sensors, optical sensors, resistive sensors, temperature sensors, the like, or any combination thereof.

Capacitive sensors detect changes in a capacitive field 96 due to the placement or movement of an object such as a finger proximate to or in contact with the proximity sensor 94. The user's finger may tap or swipe on or near the sensor 94 to input a switching event. Capacitive sensors may be actuable with substantially no force to realize switch activation. The actual sensitivity of this type of switch 92 can be tuned via a detection circuit. Capacitive switches beneficially provide immunity to interference and eliminate the need for electromechanical switch gear (e.g., pushbuttons or sliding switches).

Referring still to FIG. 5, the proximity sensor 94 controls a switch function that is integrated into the cover 52 by the application of touching the cover 52 at a targeted location (e.g., capacitive touch sense switch, etc.) that may be indicated through indicia 98. The capacitive sensor 94 transmits a signal to a controller 102 to perform an operation (e.g., light on/off, etc.). The proximity sensor 94 of this example is a touch sensitive transmitter that may be activated by, for example, a finger-touch to transmit a signal.

Since the light source 58 and/or proximity sensor is concealed within the illuminated trim assembly 30, the indicia 98 may be disposed on an outer surface of the cover 52 to direct an occupant of the vehicle 28 to a desired location for initiating the light source 58. The indicia 98 may include a photoluminescent structure 10 therein to illuminate the indicia 98. The photoluminescent structure 10 within the indicia 98 may emit a second converted light 100 in response to receiving excitation light 24 emitted from the light source 58. According to one embodiment, the second photoluminescent structure 10 contains a long persistence photoluminescent material that illuminates from the indicia 98 for a substantial amount of time (e.g., eight hours or more) once the light source 58 is returned to an unilluminated state.

Accordingly, the light source 58 described herein may be used as a concealed dome light. The concealing of the dome light, as described herein, may eliminate the need for A-surface trim and/or handling of a lighting assembly prior to assembly with the headliner 32. Moreover, by concealing the light source 58 within the headliner 32, additional headroom within the cabin 34 may be provided. As used herein, "headroom" may be defined as the distance between a vehicle seat bottom and the cover 52 of the headliner 32.

Figure 6A:
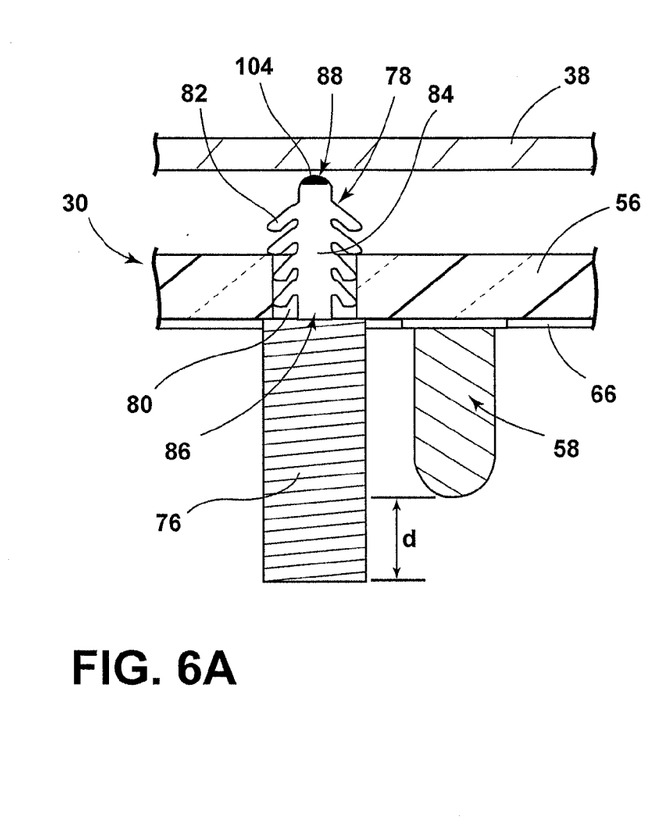
FIG. 6A is an enlarged view of the area VI of FIG. 4 illustrating a bumper extending below the light source within the headliner, according to one embodiment.
Figure 6B:
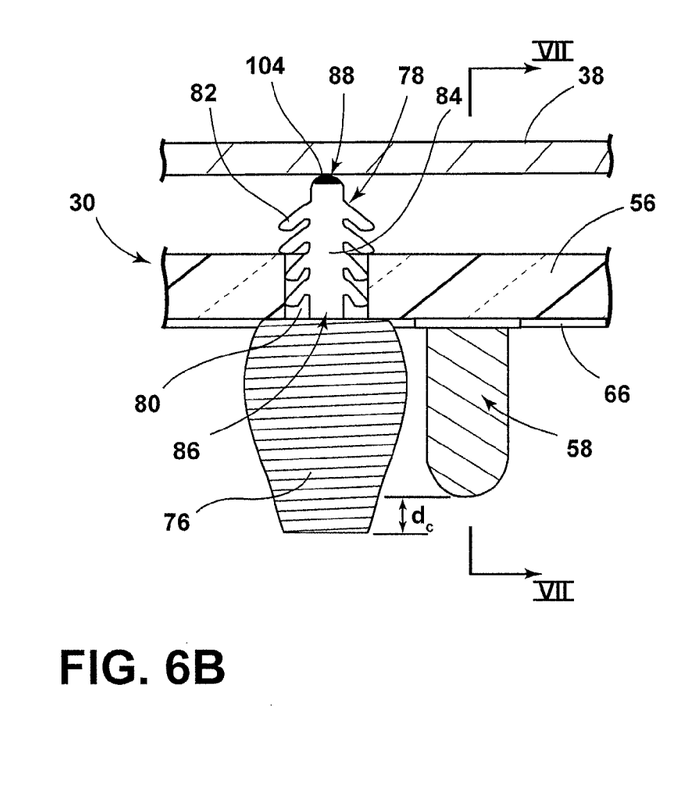
FIG. 6B is an enlarged alternate view of the area VI of FIG. 4 illustrating a bumper in a compressed state extending below the light source within the headliner, according to one embodiment.

With further reference to FIG. 5, the cover 52 and foam panel 48 may be moved upwardly such that the photoluminescent structure 10 and/or foam panel 48 contact the bumper 76. Accordingly, as illustrated in FIGS. 6A and 6B, the bumper 76 extends downwardly a distance d beyond a bottom surface of the light source 58 such that the light source 58 is protected from the upward movement of the cover 52 and foam panel 48. To provide protection for the light source 58, the bumper 76 may be a solid material, or a resilient material, which, even when compressed, as illustrated in FIG. 6B, extends a compressed distance $d_e$ below the light source 58.

With further reference to FIGS. 6A and 6B, the distal portion 88 of the retainer 78 may extend upwardly of the electrical connector 62 and include a noise dampening feature 104 thereon. The noise dampening feature 104 may be formed from a polymeric, elastomeric, fabric, or any other material that is configured to contact the roof structure 38. The noise dampening feature 104 may prevent noise, vibration, and harshness issues between the headliner 32 and the roof stricture. Additionally, the noise dampening feature 104 contacting the roof structure 38 may also prevent the PCB 56 and/or the electrical connector 62 from contacting the roof structure 38 and causing noise and/or functional issues within the trim assembly 30.

Figure 7:
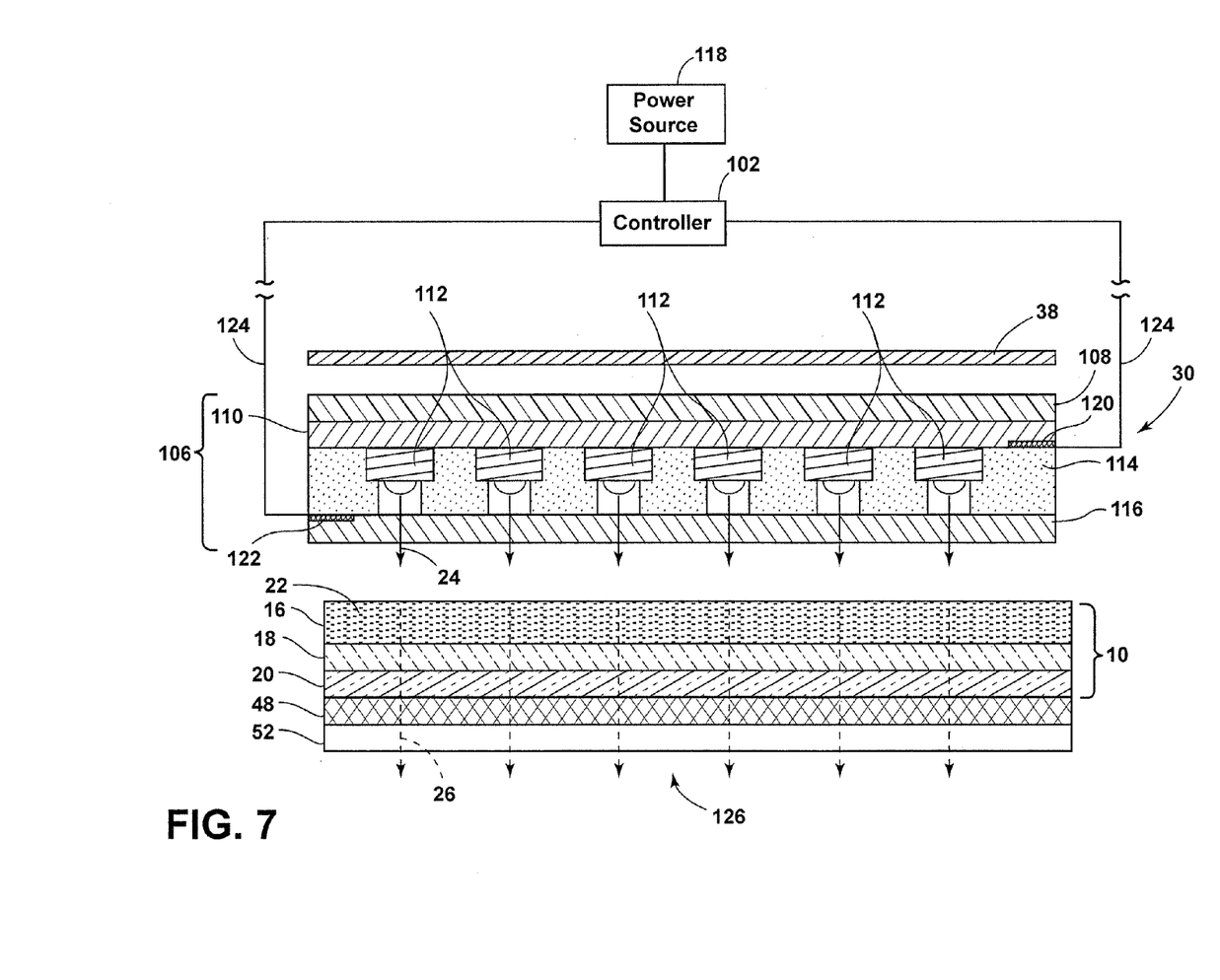
FIG. 7 is a cross-sectional view taken along line VII-VII of FIG. 6B illustrating a light source configured as a light-producing assembly, according to one embodiment.

Referring to FIG. 7, a cross-sectional view of the trim assembly 30, according to one embodiment, with a separated photoluminescent structure 10 is shown according to one embodiment. As illustrated in FIG. 7, the roof structure 38 may be disposed above the light source 58, which may have a stacked arrangement that includes a light-producing assembly 106. The photoluminescent structure 10, the foam panel 48, and/or the cover 52 may be disposed below the light-producing assembly 106.

The light-producing assembly 106 may correspond to a thin-film or printed light emitting diode (LED) assembly and includes a substrate 108 as its lowermost layer. The substrate 108 may include a polycarbonate, poly-methyl methacrylate (PMMA), or polyethylene terephthalate (PET) material on the order of 0.005 to 0.060 inches thick and is arranged over the intended vehicle substrate on which the light source 58 is to be received (e.g., the PCB 56). Alternatively, as a cost saving measure, the substrate 108 may directly correspond to a preexisting structure (e.g., the PCB 56, etc.).

The light-producing assembly 106 includes a positive electrode 110 arranged over the substrate 108. The positive electrode 110 includes a conductive epoxy such as, but not limited to, a silver-containing or copper-containing epoxy. The positive electrode 110 is electrically connected to at least a portion of a plurality of LED sources 112 arranged within a semiconductor ink 114 and applied over the positive electrode 110. Likewise, a negative electrode 116 is also electrically connected to at least a portion of the LED sources 112. The negative electrode 116 is arranged over the semiconductor ink 114 and includes a transparent or translucent conductive material such as, but not limited to, indium tin oxide. Additionally, each of the positive and negative electrodes 110, 116 are electrically connected to the controller 102 and a power source 118 via a corresponding bus bar 120, 122 and conductive leads 124. The bus bars 120, 122 may be printed along opposite edges of the positive and negative electrodes 110, 116 and the points of connection between the bus bars 120, 122 and the conductive leads 124 may be at opposite corners of each bus bar 120, 122 to promote uniform current distribution along the bus bars 120, 122. It should be appreciated that in alternate embodiments, the orientation of components within the light-producing assembly 106 may be altered without departing from the concepts of the present disclosure. For example, the negative electrode 116 may be disposed below the semiconductor ink 114 and the positive electrode 110 may be arranged over the aforementioned semiconductor ink 114. Likewise, additional components, such as the bus bars 120, 122 may also be placed in any orientation such that the light-producing assembly 106 may emit converted light 26 towards a desired location.

The LED sources 112 may be dispersed in a random or controlled fashion within the semiconductor ink 114 and may be configured to emit focused or non-focused light toward the photoluminescent structure 10. The LED sources 112 may correspond to micro-LEDs of gallium nitride elements on the order of about 5 to about 400 microns in size and the semiconductor ink 114 may include various binders and dielectric material including, but not limited to, one or more of gallium, indium, silicon carbide, phosphorous, and/or translucent polymeric binders.

The semiconductor ink 114 can be applied through various printing processes, including ink jet and silk screen processes to selected portion(s) of the positive electrode 110. More specifically, it is envisioned that the LED sources 112 are dispersed within the semiconductor ink 114, and shaped and sized such that a substantial quantity of the LED sources 112 align with the positive and negative electrodes 110, 116 during deposition of the semiconductor ink 114. The portion of the LED sources 112 that ultimately are electrically connected to the positive and negative electrodes 110, 116 may be illuminated by a combination of the bus bars 120, 122, controller 102, power source 118, and conductive leads 124. According to one embodiment, the power source 118 may correspond to a vehicular power source 118 operating at 12 to 16 VDC. Additional information regarding the construction of light-producing assemblies 60 is disclosed in U.S. Patent Publication No. 2014/0264396 A1 to Lowenthal et al. entitled "ULTRA-THIN PRINTED LED LAYER REMOVED FROM SUBSTRATE," the entire disclosure of which is incorporated herein by reference.

Referring still to FIG. 7, the photoluminescent structure 10 is disposed on the foam panel 48 as a coating, layer, film or other suitable deposition. With respect to the presently illustrated embodiment, the photoluminescent structure 10 may be arranged as a multi-layered structure including the energy conversion layer 16, the optional stability layer 18, and the optional protective layer 20, as described above. In some embodiments, the photoluminescent structure 10 may be disposed on the light-producing assembly 106.

In some embodiments, the cover 52 may be disposed below the light source 58 and the photoluminescent structure 10. However, the cover 52 may be disposed in any other location within the illuminated trim assembly 30 in alternate embodiments. The cover 52 is configured to control or modify an appearance of a viewable portion 126 of the trim assembly 30. The cover 52 may be colored any color to complement the vehicle structure upon which the illuminated trim assembly 30 is to be received. In any event, the cover 52 may be at least partially light transmissible such that the converted light 26 is not prevented from transmitting therethrough.

In some embodiments, the energy conversion layer 16 may include the first and a second photoluminescent material 22 that are interspersed within the energy conversion layer 16. Alternatively, the photoluminescent materials 22 may be isolated from each other if desired. Also, it should be appreciated that the energy conversion layer 16 may include more than two different photoluminescent materials 22, in which case, the teachings provided herein similarly apply.

With respect to the presently illustrated embodiment, the excitation of photoluminescent materials 22 is mutually exclusive. That is, photoluminescent materials 22 are formulated to have non-overlapping absorption spectrums and Stoke shifts that yield different emission spectrums. Also, in formulating the photoluminescent materials 22, care should be taken in choosing the associated Stoke shifts such that the converted light 26 emitted from one of the photoluminescent materials 22, does not excite the other, unless so desired. According to one exemplary embodiment, a first portion of the LED sources 112 may be configured to emit an excitation light 24 having an emission wavelength that only excites the first photoluminescent material 22 and results in the excitation light 24 being converted into a visible converted light 26 of a first color (e.g., white). Likewise, a second portion of the LED sources 112 may be configured to emit an excitation light 24 having an emission wavelength that only excites second photoluminescent material 22 and results in the excitation light 24 being converted into a visible converted light 26 of a second color (e.g., red). Preferably, the first and second colors are visually distinguishable from one another. In this manner, any of the LED sources 112 may be selectively activated using a controller 102 to cause the photoluminescent structure 10 to luminesce in a variety of colors.

Figure 8:
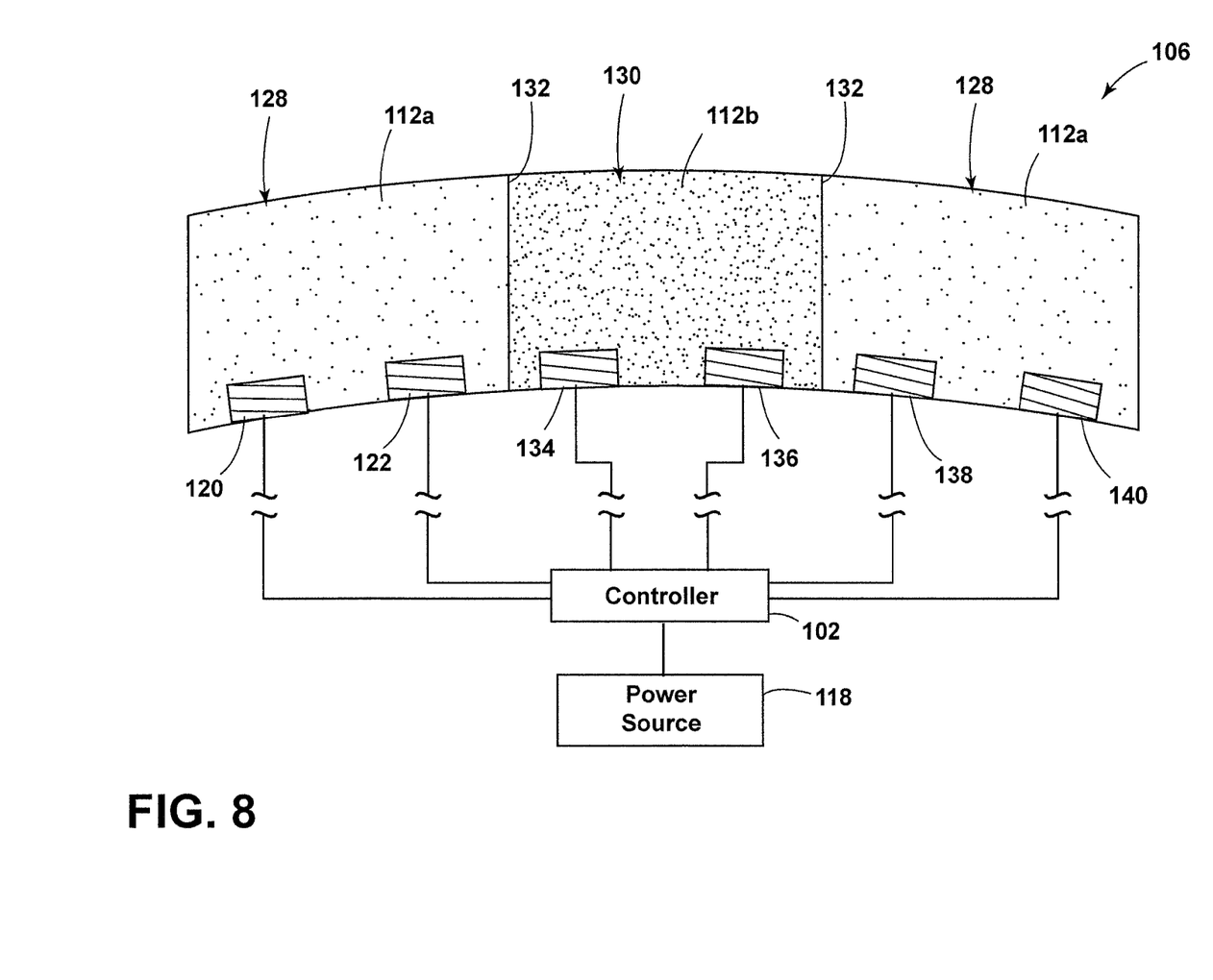
FIG. 8 illustrates a top view of the light-producing assembly, according to one embodiment, having varying types and concentrations of light-emitting diode (LED) sources transversely along the light-producing assembly.

Referring to FIG. 8, a light-producing assembly 106, according to one embodiment, is illustrated from a top view having varying types and concentrations of LED sources 112a, 112b transversely along the light-producing assembly 106. As illustrated, a first portion 128 of the light-producing assembly 106 includes LED sources 112a that are configured to emit an excitation light 24 having an emission wavelength in a first color spectrum. Likewise, a second portion 130 of the light-producing assembly 106 includes LED sources 112b that are configured to emit an excitation light 24 having an emission wavelength in a second color spectrum. The first and second portions 128, 130 of the light-producing assembly 106 may be separated by insulative, or non-conductive, barriers 132 from proximately disposed portions through any means known in the art such that each portion 128, 130 may be illuminated independently of any other portion 128, 130. The insulative barriers 132 may also prevent a substantial amount of excitation light 24 from proximately illuminated LED sources 112a, 112b from crossing through the insulative barrier 132. Further, each portion 128, 130 disposed within the light-producing assembly 106 may include a respective bus bar 120, 122, 134, 136, 138, 140 coupled to the controller 102 and configured to illuminate each respective portion 128, 130.

According to one embodiment, the first and second colors are visually distinguishable from one another. In this manner, LED sources 112a and 112b may be selectively activated using the controller 102 to cause the LED sources 112a, 112b to illuminate in a variety of colors. For example, the controller 102 may activate only LED sources 112a to exclusively illuminate a portion 128 of the light-producing assembly 106 in the first color. Alternatively, the controller 102 may activate only LED sources 112b to exclusively illuminate a portion 130 of the light-producing assembly 106 in the second color. It should be appreciated that the light-producing assembly 106 may include any number of portions 128, 130 having varying LED sources 112a, 112b that may illuminate in any desired color. Moreover, it should also be appreciated that the portions 128, 130 having varying LED sources 112a, 112b may be orientated in any practicable manner and need not be disposed adjacently.

As described above, a photoluminescent structure 10 may be disposed on a portion of the light-producing assembly 106. If desired, any of the LED sources 112a, 112b may be utilized for exciting any photoluminescent material 22 disposed proximately to and/or above the light-producing assembly 106.

The semiconductor ink 114 may also contain various concentrations of LED sources 112a, 112b such that the concentration of the LED sources 112a, 112b, or number of LED sources 112a, 112b per unit area, may be adjusted for various lighting applications. In some embodiments, the concentration of LED sources 112a, 112b may vary across the length of the light-producing assembly 106. For example, a first portion 128 of the light-producing assembly 106 may have a greater concentration of LED sources 112 than alternate portions 130, or vice versa. In such embodiments, the light source 58 and/or the indicia 98 may appear brighter or have a greater luminance in order to preferentially illuminate pre-defined locations. In other embodiments, the concentration of LED sources 112a, 112b may increase or decrease with increasing distance from a preselected point. According to one embodiment, the light-producing assembly 106 may include a higher concentration of LED sources 112a in the second portion 130 such that the second portion 130 may illuminate as a dome light, while the first portion 128 may provide ambient lighting.

Figure 9:
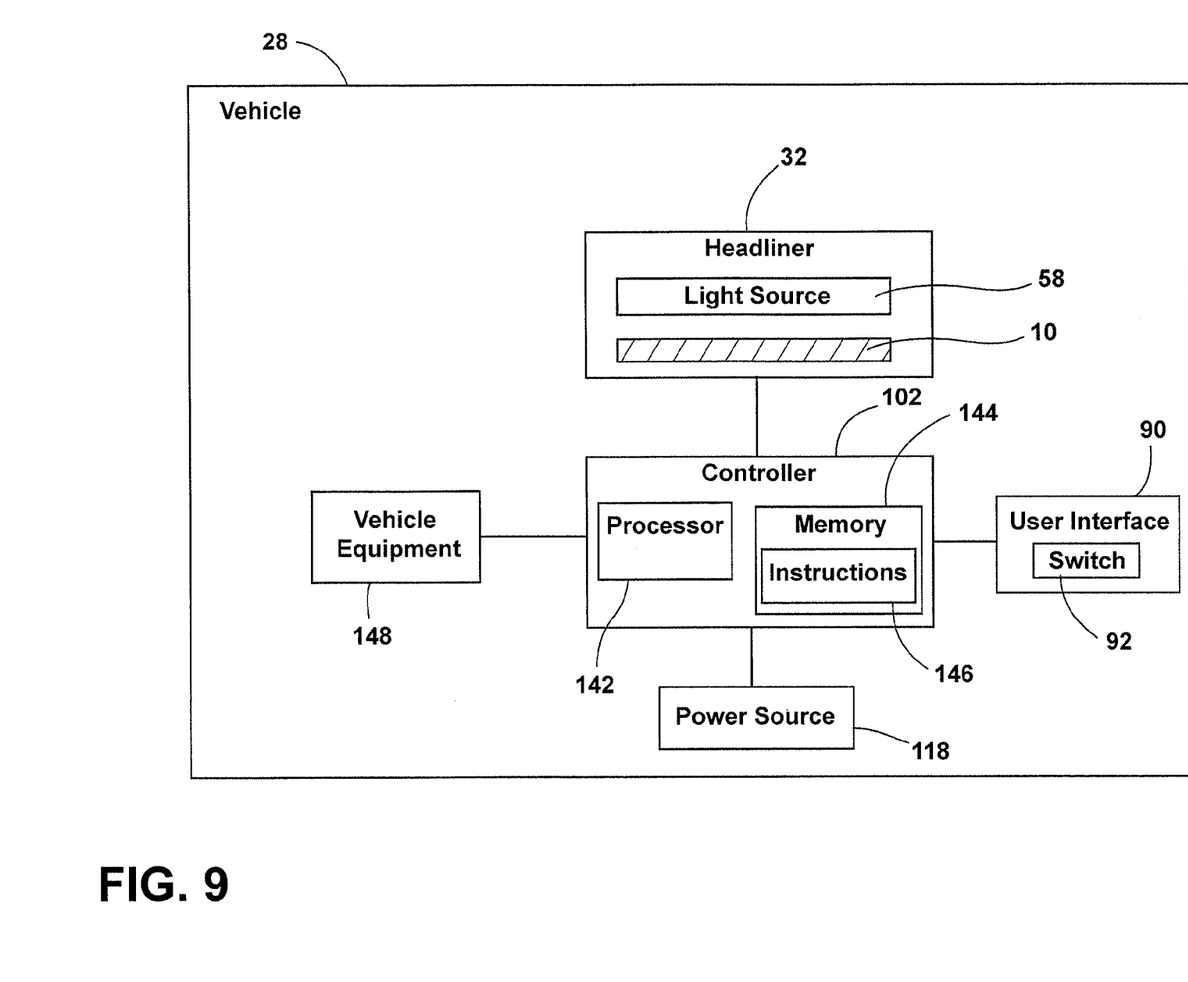
FIG. 9 is a block diagram of the vehicle, the illuminated trim assembly, and the lighting control.

Referring to FIG. 9, a block diagram of the vehicle 28 incorporating the illuminated trim assembly 30 is shown, according to one embodiment. The vehicle 28 includes the light source 58, which is electrically coupled to the controller 102 that is electrically connected to a power source 118. In one embodiment, the power source 118 may correspond to a vehicular power source operating at 12 to 16 VDC. The controller 102 may be variously located within the vehicle 28 and includes a processor 142 in communication with a memory 144. The memory 144 includes instructions 146 stored thereon that are executable by the processor 142.

The controller 102 may be communicatively coupled to one or more vehicle equipment 148 and use signals received therefrom to control the corresponding light source 58, which determines the resultant luminescent appearance exhibited by the illuminated trim assembly 30. The controller 102 may communicate with the one or more vehicle equipment 148 and may receive signals therefrom directed to a vehicle-related condition such as, but not limited to, an operational state of the vehicle 28, a status related to a particular vehicle equipment 148 (e.g., door open status), a key fob proximity status, a remote signal sourced from a portable electronic device, a status related to an operating environment of the vehicle 28 (e.g., an ambient light level), an occupant illumination preference, or any other information or control signal that may be utilized to activate or otherwise adjust the output of the light source 58.

Further, the controller 102 may be communicatively coupled to a user interface 90 that may be configured to allow a user to control the light source 58. According to one embodiment, the user interface 90 includes the switch 92, thereby allowing a user to control the corresponding light source 58 based on at least one touch event. The switch 92 may be located on, or within, the illuminated trim assembly 30, or elsewhere located in the vehicle 28.

In operation, each photoluminescent structure 10 may exhibit a constant unicolor or multicolor illumination. For example, the controller 102 may prompt the light source 58 to emit only the first wavelength of light via the LED sources 112 to cause the photoluminescent structure 10 to illuminate in the first color (e.g., white). Alternatively, the controller 102 may prompt the light source 58 to emit only the second wavelength of light via the LED sources 112 to cause the photoluminescent structure 10 to illuminate in the second color (e.g., red). Alternatively still, the controller 102 may prompt the light source 58 to simultaneously emit the first and second wavelengths of light to cause the photoluminescent structures 10 to illuminate in a third color (e.g., pinkish) defined by an additive light mixture of the first and second colors. Moreover, additional photoluminescent structures may be added to the illuminated trim assembly 30 that convert the excitation light 24 emitted from the light source 58 to a different wavelength. Alternatively still, the controller 102 may prompt the light source 58 to alternate between periodically emitting the first and second wavelengths of excitation light 24 to cause the photoluminescent structure 10 to periodically illuminate by alternating between the first and second colors of converted light 26. The controller 102 may prompt the light source 58 to periodically emit the first and/or second wavelengths of excitation light 24 at a regular time interval and/or an irregular time interval.

With respect to the above examples, the controller 102 may modify the intensity of the emitted first and second wavelengths of light by pulse-width modulation or current control. In some embodiments, the controller 102 may be configured to adjust a color of the outputted light by sending control signals to adjust an intensity or energy output level of the light source 58. For example, if the light source 58 is configured to output the first emission at a low level, substantially all of the excitation light 24 may be converted to the outputted, visible light. If the light source 58 is configured to emit excitation light 24 at a high level, only a portion of the excitation light 24 may be converted to the converted light 26 by the photoluminescent structure 10. In this configuration, a color of light corresponding to mixture of the excitation light 24 and the converted light 26 may be output as the outputted light. In this way, each of the controllers 102 may control an output color of the outputted converted light 26.

Though a low level and a high level of intensity are discussed in reference to the excitation light 24, it shall be understood that the intensity of the excitation light 24 may be varied among a variety of intensity levels to adjust a hue of the color corresponding to the emitted excitation and/or converted light 24, 26 from the illuminated trim assembly 30. As described herein, the color of the converted light 26 may be significantly dependent on the particular photoluminescent material 22 utilized in the photoluminescent structure 10. Additionally, a conversion capacity of the photoluminescent structure 10 may be significantly dependent on a concentration of the photoluminescent structures 10 utilized in the photoluminescent structure 10. By adjusting the range of intensities that may be emitted from the light source 58, the concentration and proportions of the photoluminescent materials 22 in the photoluminescent structure 10 and the types of photoluminescent materials 22 utilized in the photoluminescent structure 10 discussed herein may be operable to generate a range of color hues of outputted light by blending the excitation light 24 with the converted light 26. It is also contemplated that the intensity of each light source 58 may be varied simultaneously, or independently, from any number of other light source 58.

Accordingly, an illuminated trim assembly for a vehicle has been advantageously described herein. The illuminated trim assembly provides various benefits including an efficient and cost-effective means to produce illumination that may function as a distinct styling element that increases the refinement of a vehicle.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:
1. A trim assembly for a vehicle, comprising:
a backing panel defining a void therethrough;
a foam panel attached to the backing panel on a first side and attached to a cover on a second opposing side, wherein the foam panel and the cover are light transmissive;

a light source disposed within the void and configured to emit excitation light;

a photoluminescent structure disposed on an inner periphery of the void and the first side of the foam panel and configured to luminesce in response to excitation by the light source; and a bumper extending into the void to a position past a bottom surface of the light source.

2. The trim assembly for a vehicle of claim 1, further comprising:

a switch configured to actuate a control output of the light source.

3. The trim assembly for a vehicle of claim 1, wherein the bumper includes a retainer coupled thereto.

4. The trim assembly for a vehicle of claim 3, wherein the retainer is configured to extend upwardly of an electrical connector disposed on an upward side of the backing panel.

5. The trim assembly for a vehicle of claim 1, wherein the photoluminescent structure includes at least one photoluminescent material therein configured to convert an excitation light received from the light source into a visible converted light.

6. The trim assembly for a vehicle of claim 1, wherein the light source is disposed on a printed circuit board (PCB) such that the light source is encapsulated between the PCB, the backing panel and the foam panel.

7. The trim assembly for a vehicle of claim 6, wherein the PCB is integrally coupled to the backing panel during a multistep molding process.

8. A vehicle, comprising:

a headliner including a backing panel, a foam panel, and a cover;

a light source disposed within a void defined by the backing panel;

an at least partially transparent bumper extending into the void; and a photoluminescent structure disposed on the foam panel and configured to luminesce in response to excitation by a light source.

9. The vehicle of claim 8, further comprising a controller for selectively activating the light source.

10. The vehicle of claim 8, wherein light source is configured as a light-producing assembly that includes LED sources dispersed in a printed LED arrangement.

11. The vehicle of claim 10, wherein the LED sources are dispersed in a variable concentration along the light-producing assembly.

12. The vehicle of claim 8, further comprising:

a switch disposed within the void and configured to actuate a control output of the light source.

13. The vehicle of claim 12, further comprising:

indicia disposed on the cover to indicate a location of the switch.

14. The vehicle of claim 8, wherein the photoluminescent structure comprises at least one photoluminescent material configured to perform an energy conversion on an excitation light received from at least a portion of the light source into a visible, converted light that is outputted through a viewable portion.

15. A headliner for a vehicle, comprising:

a backing panel defining a void;

a light source disposed within the void;

a first photoluminescent structure disposed at one end of the void;

a bumper disposed within the void, the bumper extending a first distance beyond the light source in a neutral state and a second, shorter distance beyond the light source in a compressed state; and a retainer coupled to the bumper extending above the backing panel.

16. The headliner for a vehicle of claim 15, wherein the retainer further includes a noise dampening feature on a distal portion thereof.

17. The headliner for a vehicle of claim 16, further comprising:

a foam panel having the first photoluminescent structure thereon that is configured to luminesce in response to excitation by the light source.

18. The headliner for a vehicle of claim 17, wherein the first photoluminescent structure comprises at least one photoluminescent material configured to perform an energy conversion on an excitation light received from at least a portion of the light source into a visible, converted light that is outputted to a viewable portion.

19. The headliner for a vehicle of claim 17, further comprising:

a cover disposed on a bottom surface of the foam panel having indicia thereon.

20. The headliner for a vehicle of claim 19, wherein the indicia includes a second photoluminescent structure having a long persistence phosphorescent material therein.

\* \* \* \* \*